US012695033B2

(12) United States Patent
Park et al.

(10) Patent No.: US 12,695,033 B2
(45) Date of Patent: Jul. 28, 2026

(54) MULTILAYER ELECTRONIC COMPONENT

(71) Applicant: SAMSUNG ELECTRO-MECHANICS CO., LTD., Suwon-si (KR)

(72) Inventors: Yong Park, Suwon-si (KR); Hye Yeon Kim, Suwon-si (KR); Kwan Soo Park, Suwon-si (KR); Jin Ho Choi, Suwon-si (KR); Jong Ho Lee, Suwon-si (KR); Eun Jung Lee, Suwon-si (KR); Yong Min Hong, Suwon-si (KR); Sun Mi Kim, Suwon-si (KR); Chang Ho Seo, Suwon-si (KR); Young Rae Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 141 days.

(21) Appl. No.: 18/894,062

(22) Filed: Sep. 24, 2024

(65) Prior Publication Data

US 2025/0201480 A1     Jun. 19, 2025

(30) Foreign Application Priority Data

Dec. 19, 2023     (KR) ........................ 10-2023-0186254

(51) Int. Cl.
*H01G 4/30* (2006.01)
*H01G 4/232* (2006.01)

(52) U.S. Cl.
CPC .............. *H01G 4/30* (2013.01); *H01G 4/232* (2013.01)

(58) Field of Classification Search
CPC ........... H01G 4/002; H01G 4/224; H01G 4/30
See application file for complete search history.

(56) References Cited

U.S. PATENT DOCUMENTS

| | | | | |
|---|---|---|---|---|
| 2014/0362492 | A1* | 12/2014 | Lee | .......................... H01G 4/30 29/25.42 |
| 2017/0076864 | A1* | 3/2017 | Okai | ...................... H01G 4/224 |
| 2017/0076870 | A1* | 3/2017 | Noda | ..................... H01G 4/232 |
| 2021/0193389 | A1 | 6/2021 | Kim et al. | |
| 2022/0130612 | A1 | 4/2022 | Lee et al. | |
| 2024/0387114 | A1* | 11/2024 | Seo | ......................... H01G 4/232 |
| 2026/0058065 | A1* | 2/2026 | Park | ......................... H01G 4/30 |

FOREIGN PATENT DOCUMENTS

| | | |
|---|---|---|
| KR | 10-2021-0081668 A | 7/2021 |
| KR | 10-2022-0056457 A | 5/2022 |
| KR | 10-2024-0166358 A | 11/2024 |

* cited by examiner

*Primary Examiner* — Nathan Milakovich
(74) *Attorney, Agent, or Firm* — MORGAN, LEWIS & BOCKIUS LLP

(57) ABSTRACT

A multilayer electronic component according to an example embodiment of the present disclosure may include: a body including a dielectric layer and internal electrodes; first and second external electrodes disposed on the body; and first and second side margin portions disposed on the body, and the first and second side margin portions may include a first extension portion disposed to extend onto portions of the first and second surfaces, and when a third directional size of a central portion of the first extension portion in the second direction is referred to as WM1, and a third directional size of an end of the first extension portion in the second direction is referred to as WC1, WM1<WC1 may be satisfied.

20 Claims, 6 Drawing Sheets

FIRST
DIRECTION

SECOND
DIRECTION

THIRD
DIRECTION

FIRST
DIRECTION

SECOND
DIRECTION

I-I'

MULTILAYER ELECTRONIC COMPONENT

CROSS-REFERENCE TO RELATED APPLICATION(S)

This application claims benefit of priority to Korean Patent Application No. 10-2023-0186254 filed on Dec. 19, 2023, in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser, mounted on the printed circuit boards of various types of electronic product, such as image display devices including a liquid crystal display (LCD) and a plasma display panel (PDP), computers, smartphones and mobile phones, and serves to charge or discharge electricity therein or therefrom.

The multilayer ceramic capacitor may be used as a component in various electronic devices due to having a small size, ensuring high capacitance and being easily mounted. With the miniaturization and implementation of high output power of various electronic devices such as computers and mobile devices, demand for miniaturization and high capacitance of multilayer ceramic capacitors has also been increasing.

For the miniaturization and high capacitance of the multilayer ceramic capacitor, maximization of an effective electrode area (increasing the effective volume fraction required to realize capacitance) is required. In order to implement such a miniaturized and high capacitance multilayer ceramic capacitor, in manufacturing a multilayer ceramic capacitor, a method has been applied in which by exposing internal electrodes in a width direction of a body, an area of the internal electrodes in the width direction is maximized through a margin-free design, but after manufacturing such a body, a ceramic green sheet for side margin portions is separately attached to an exposed surface of the electrode in the width direction of the body in a pre-sintering operation and is then sintered.

The capacitance per unit volume of the capacitor may be improved by forming the side margin portion by a method of separately attaching the ceramic green sheet for a side margin portion, but problems such as shortened chip lifespan or defects may occur due to penetration of external moisture through an interfacial bonding portion of the body and the side margin portion, or penetration of plating solution during a plating process.

Additionally, aggregate concentration occurs due to pores generated in an interfacial surface on which the body and the side margin portion are in contact with each other, and thus, the problem of lowering the breakdown voltage (BDV) may occur, the pores may cause a decrease in moisture resistance reliability due to a decrease in sintering densification, and interfacial bonding portions may occur at boundaries between the body and the side margin portion, resulting in a decrease in bonding strength and a subsequent decrease in moisture resistance reliability.

Accordingly, in ultra-small and high-capacitance products, a design preventing a decrease in the breakdown voltage (BDV) and a decrease in moisture resistance reliability is required.

SUMMARY

An aspect of the present disclosure is to provide a multilayer electronic component having improved moisture resistance reliability by preventing penetration of external moisture by complementing an interface structure of a body and a side margin portion.

An aspect of the present disclosure is to prevent the occurrence of interface delamination or interface lifting at a side margin portion by improving bonding strength between a body and the side margin portion.

However, the aspects of the present disclosure are not limited to the above-described contents, and may be more easily understood in the process of describing specific example embodiments of the present disclosure.

A multilayer electronic component according to an example embodiment of the present disclosure may include: a body including a dielectric layer and internal electrodes alternately disposed with the dielectric layer in a first direction, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; first and second external electrodes disposed on the third and fourth surfaces, respectively; and first and second side margin portions disposed on the fifth and sixth surfaces, respectively, and the first and second side margin portions may include a first extension portion disposed to extend onto portions of the first and second surfaces, and when a third directional size of a central portion of the first extension portion in the second direction is referred to as WM1, and a third directional size of an end of the first extension portion in the second direction is referred to as WC1, WM1<WC1 may satisfied.

A multilayer electronic component according to another example embodiment of the present disclosure may include: a body including a dielectric layer and internal electrodes alternately disposed with the dielectric layer in a first direction, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; first and second external electrodes disposed on the third and fourth surfaces, respectively; and first and second side margin portions disposed on the fifth and sixth surfaces, respectively, and the first and second side margin portions may include a second extension portion extending to a portion of the third and fourth surfaces, and when a third directional size of a central portion of the second extension portion in the first direction is referred to as WM2, and a third directional size of an end of the second extension portion in the first direction is referred to as WC2, WM2<WC2 may be satisfied.

One of the various effects of the present disclosure is to improve the moisture resistance reliability of a multilayer electronic component by preventing penetration of external moisture by complementing an interface structure of a body and a side margin portion.

One of the various effects of the present disclosure is to prevent the occurrence of interface delamination or interface lifting at a side margin portion by improving the adhesion between a body and the side margin portion.

However, advantages and effects of the present application are not limited to the foregoing content and may be more easily understood in the process of describing a specific example embodiment of the present disclosure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
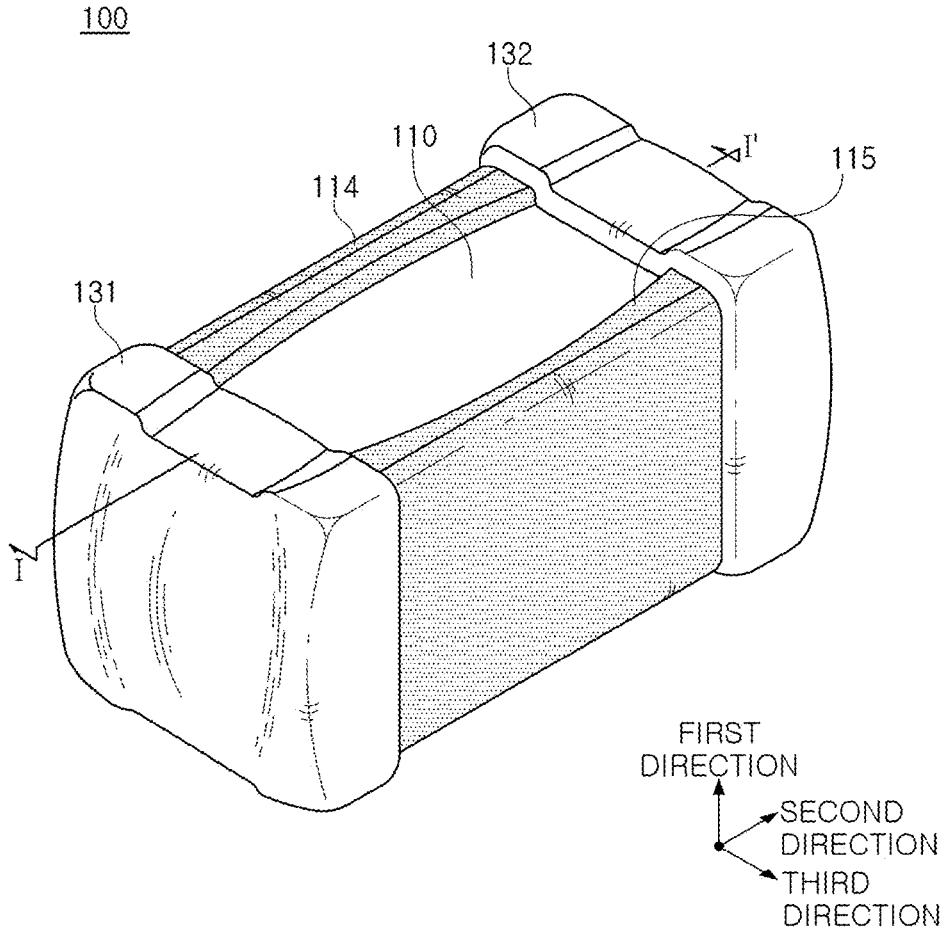
FIG. 1 is a perspective view schematically illustrating a multilayer electronic component according to an example embodiment of the present disclosure.

Hereinafter, example embodiments of the present disclosure will be described with reference to specific example embodiments and the attached drawings. The example embodiments of the present disclosure may, however, be exemplified in many different forms and should not be construed as being limited to the specific embodiments set forth herein. The example embodiments disclosed herein are provided for those skilled in the art to better explain the present disclosure. Therefore, in the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

FIG. 1 is a perspective view schematically illustrating a multilayer electronic component according to an example embodiment of the present disclosure.

Figure 2:
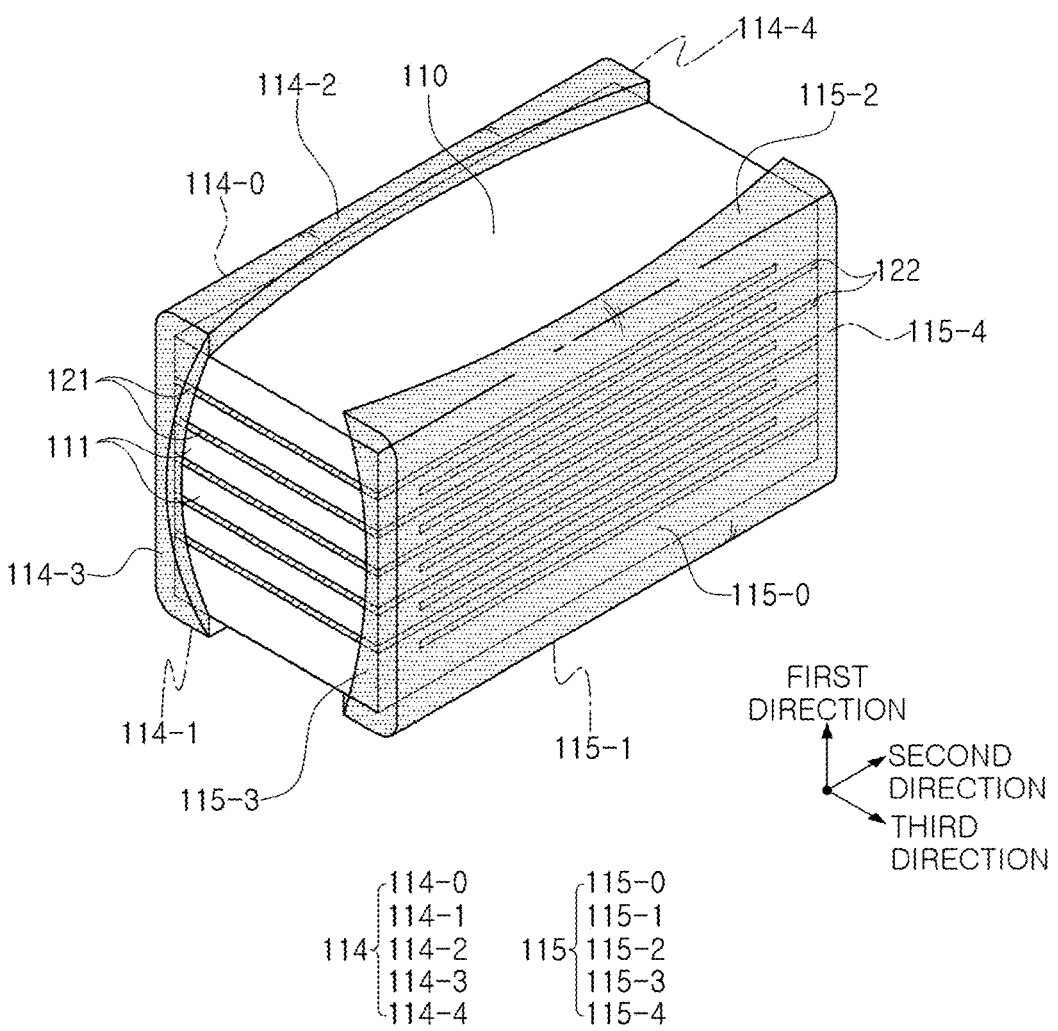
FIG. 2 illustrates a perspective view excluding an external electrode in the multilayer electronic component of FIG. 1.

FIG. 2 illustrates a perspective view excluding an external electrode in the multilayer electronic component of FIG. 1.

Figure 3:
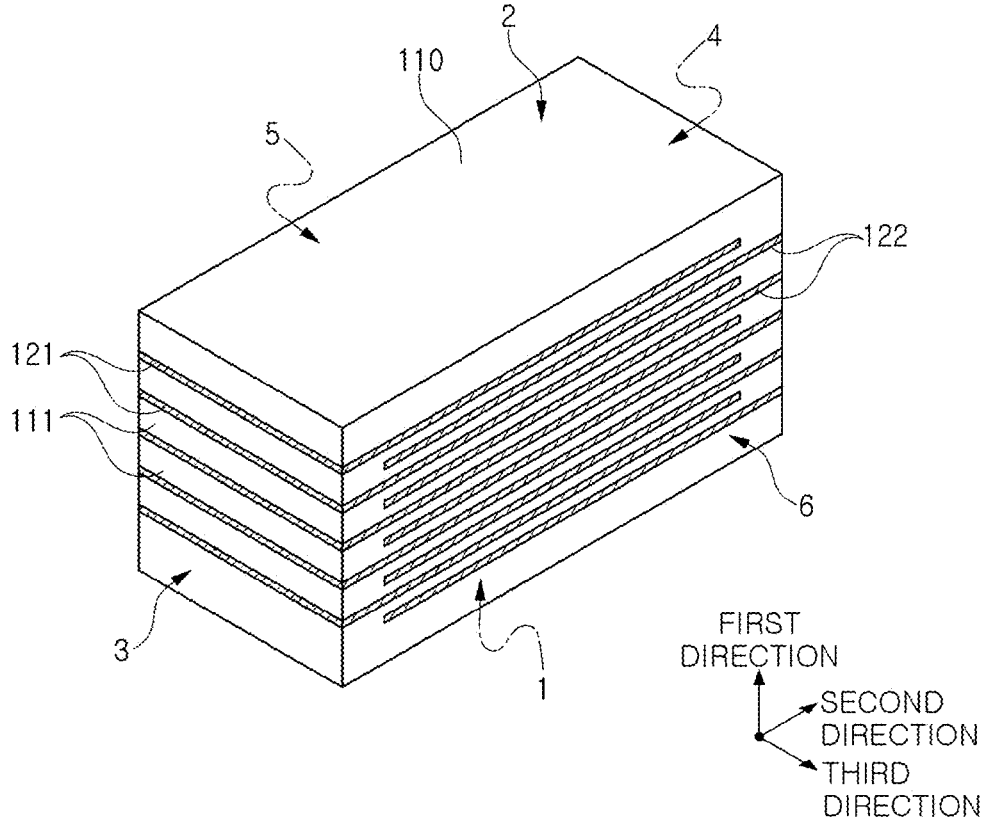
FIG. 3 schematically illustrates a perspective view excluding an external electrode and a side margin portion in the multilayer electronic component of FIG. 1.

FIG. 3 schematically illustrates a perspective view excluding an external electrode and a side margin portion in the multilayer electronic component of FIG. 1.

Figure 4:
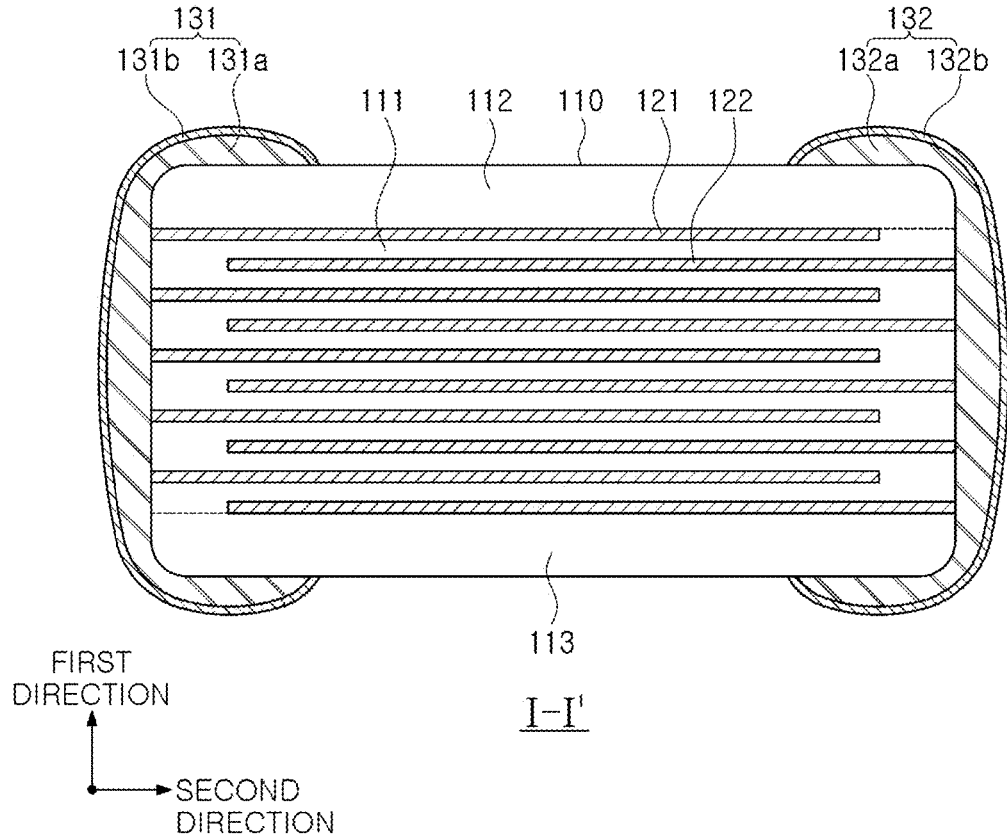
FIG. 4 is a schematic cross-sectional view taken along line I-I' of FIG. 1.

FIG. 4 is a schematic cross-sectional view taken along line I-I' of FIG. 1.

Figure 5:
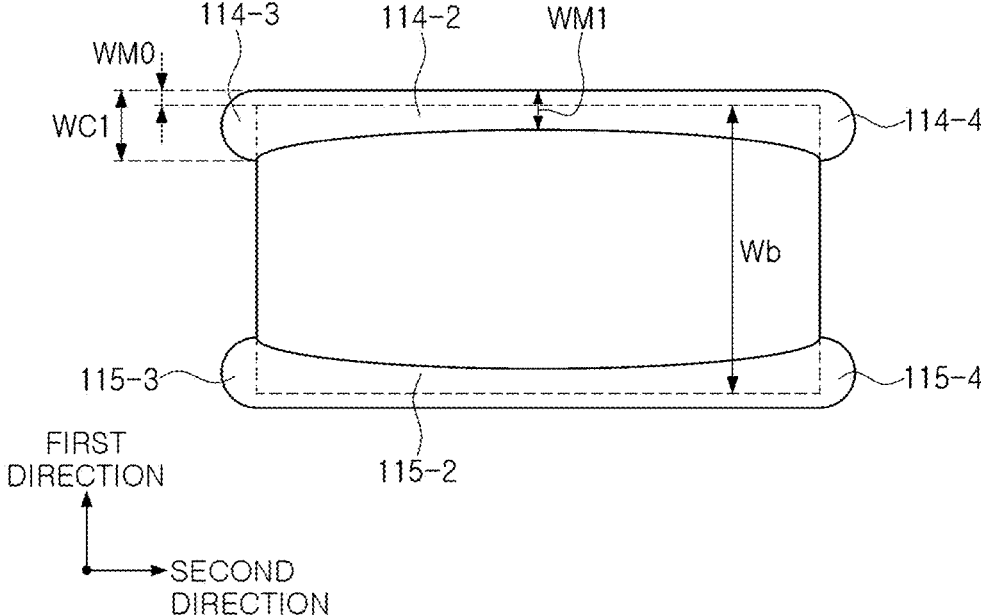
FIG. 5 schematically illustrates a plan view (a view viewed from an upper portion in a first direction) of FIG. 2.

FIG. 5 schematically illustrates a plan view (a view viewed from an upper portion in a first direction) of FIG. 2.

Figure 6:
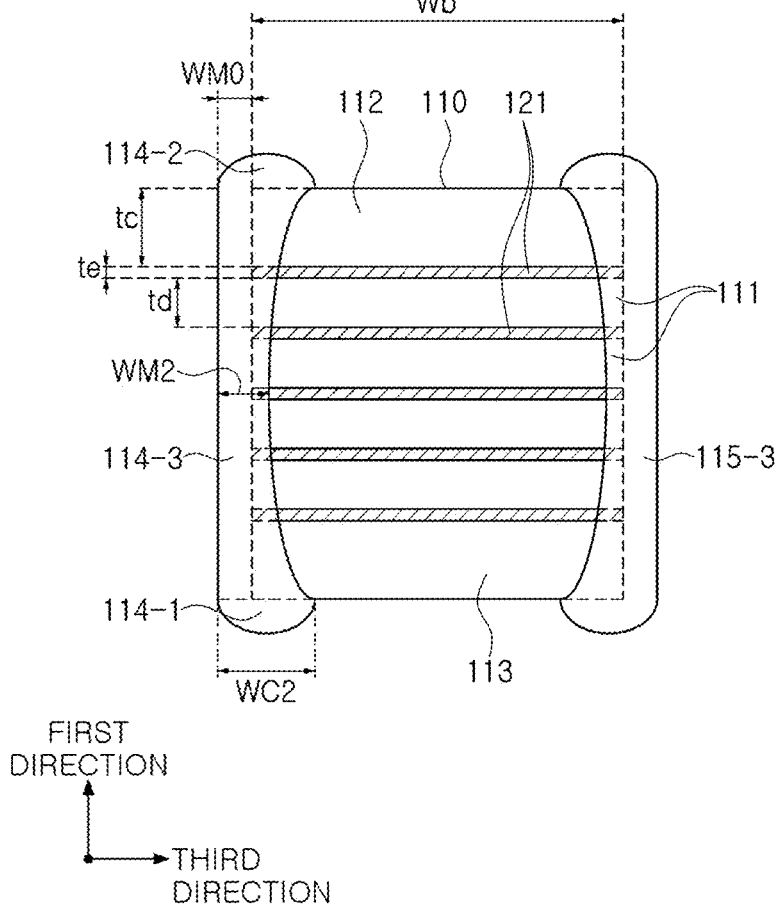
FIG. 6 schematically illustrates a side view (a view viewed from the left side in a second direction) of FIG. 2.

FIG. 6 schematically illustrates a side view (a view viewed from the left side in a second direction) of FIG. 2.

Hereinafter, a multilayer electronic component according to an example embodiment of the present disclosure will be described in detail with reference to FIGS. 1 to 6. However, as an example of a multilayer electronic component, a multilayer ceramic capacitor will be described, but the multilayer electronic component of the present disclosure may also be applied to various electronic products using dielectric compositions, such as inductors, piezoelectric elements, varistors, or thermistors.

A multilayer electronic component 100 according to an example embodiment of the present disclosure may include: a body 110 including a dielectric layer 111 and internal electrodes 121 and 122 arranged alternately with the dielectric layer 111 in a first direction, and including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3 and 4 and opposing each other in a third direction; first and second external electrodes 131 and 132 disposed on the third and fourth surfaces 3 and 4, respectively; and first and second side margin portions 114 and 115 disposed on the fifth and sixth surfaces 5 and 6, respectively, and the first and second side margin portions 114 and 115 may include first extension portions 114-1, 114-2, 115-1 and 115-2 disposed to extend onto portions of the first and second surfaces, and when a third directional size of a central portion of the first extension portions 114-1, 114-2, 115-1 and 115-2 in the second direction is referred to as WM1, and a third directional size of an end of the first extension portions 114-1, 114-2, 115-1 and 115-2 in the second direction is referred to as WC1, WM1<WC1 may be satisfied.

The body 110 may have dielectric layers 111 and internal electrodes 121 and 122 alternately stacked.

More specifically, the body 110 may include a capacitance formation portion Ac disposed inside the body 110, and including first internal electrodes 121 and second internal electrodes 122 alternately arranged to face each other with the dielectric layer 111 interposed therebetween to form capacitance.

There is no particular limitation on the specific shape of the body 110, but as illustrated, the body 110 may have a hexahedral shape or a shape similar thereto. Due to contraction of ceramic powder particles included in the body 110 during a sintering process, the body 110 may not have a hexahedral shape with entirely straight lines, but may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3 and 4 and opposing each other in the third direction.

In a state in which a plurality of dielectric layers 111 included in the body 110 are sintered, boundaries between adjacent dielectric layers 111 may be integrated so as to be difficult to identify without using a scanning electron microscope (SEM).

The materials included in the dielectric layer 111 is not limited as ling as sufficient electrostatic capacitance may be obtained therewith. In general, a perovskite (ABO$_3$)-based material may be used, and, for example, a barium titanate-based material, a lead composite perovskite-based material, or a strontium titanate-based material may be used. The barium titanate-based material may include BaTiO$_3$-based ceramic particles, and examples of ceramic particles may include BaTiO$_3$, and (Ba$_{1-x}$Ca$_x$)TiO$_3$ (0<x<1), Ba(Ti$_{1-y}$Ca$_y$)O$_3$ (0<y<1), (Ba$_{1-x}$Ca$_x$)(Ti$_{1-y}$Zr$_y$)O$_3$ (0<x<1, 0<y<1) or Ba(Ti$_{1-y}$Zr$_y$)O$_3$ (0<y<1), which is formed by partially employing calcium (Ca) and zirconium (Zr) in BaTiO$_3$.

Additionally, as the materials included in the dielectric layer 111, various ceramic additives, organic solvents, binders, dispersants, and the like, may be added to particles such as barium titanate (BaTiO$_3$) according to the purpose of the present disclosure.

A thickness td of the dielectric layer 111 is not limited.

However, in order to more easily achieve the miniaturization and the high capacitance of the multilayer electronic component, the thickness of the dielectric layer 111 may be 1.0 μm or less, preferably 0.6 μm or less, and more preferably 0.4 μm or less.

Here, the thickness td of the dielectric layer 111 may refer to a thickness td of the dielectric layer 111 disposed between the first and second internal electrodes 121 and 122.

Meanwhile, the thickness td of the dielectric layer 111 may refer to a first directional size of the dielectric layer 111. Additionally, the thickness td of the dielectric layer 111 may refer to an average thickness td of the dielectric layer 111, and may refer to an average size of the dielectric layer 111 in the first direction.

The average size of the dielectric layer 111 in the first direction may be measured by scanning first and second directional cross-sections of the body 110 with a scanning electron microscope (SEM) of 10,000× magnification. More specifically, the average size of one dielectric layer 111 in the first direction may be an average value calculated by measuring the first directional size of one dielectric layer 111 at 30 points spaced apart from each other at equal intervals in the second direction in the scanned image. The 30 points spaced apart from each other at equal intervals may be designated in the capacitance formation portion Ac. Additionally, when the average value is measured by extending an average value measurement up to 10 dielectric layers 111, an average thickness of the dielectric layers 111 in the first directional may be further generalized.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 may be alternately arranged to face each other with the dielectric layer 111 included in the body 110 interposed therebetween, and may be exposed to the third and fourth surfaces 3 and 4 of the body 110, respectively.

More specifically, the first internal electrode 121 may be spaced apart from the fourth surface 4 and may be exposed through the third surface 3, and the second internal electrode 122 may be spaced apart from the third surface 3 and may be exposed through the fourth surface 4. A first external electrode 131 may be disposed on the third surface 3 of the body 110 and may be connected to the first internal electrode 121, and a second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

Meanwhile, the body 110 may be formed by alternately stacking ceramic green sheets on which the first internal electrode 121 is printed and ceramic green sheets on which the second internal electrode 122 are printed, and then sintering the ceramic green sheets.

The material included in the internal electrodes 121 and 122 is not particularly limited, and any material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Additionally, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti) and alloys thereof on a ceramic green sheet. A printing method for the conductive paste for internal electrodes may be a screen-printing method or a gravure printing method, but the present disclosure is not limited thereto.

Meanwhile, a thickness te of the internal electrodes 121 and 122 is not limited.

However, in order to more easily achieve the miniaturization and the high capacitance of the multilayer electronic component, the thickness of the internal electrodes 121 and 122 may be 1.0 μm or less, preferably 0.6 μm or less, and more preferably 0.4 μm or less.

Here, the thickness te of the internal electrodes 121 and 122 may refer to a first directional size of the internal electrodes 121 and 122. Additionally, the thickness te of the internal electrodes 121 and 122 may refer to an average thickness te of the internal electrodes 121 and 122, and may refer to an average size of the internal electrodes 121 and 122 in the first direction.

The average size of the internal electrodes 121 and 122 in the first direction may be measured by scanning images of the first and second directional cross-sections of the body 110 with a scanning electron microscope (SEM) of 10,000× magnification. More specifically, the average size of one internal electrode in the first direction may be an average value calculated by measuring the first directional size of one internal electrode at 30 points spaced apart from each other at equal intervals in the second direction in the scanned image. The 30 points spaced apart from each other at equal intervals may be designated in the capacitance formation portion Ac. Additionally, when the average value is measured by extending an average value measurement up to 10 internal electrodes, an average thickness of the internal electrode in the first directional may be further generalized.

Meanwhile, the body 110 may include cover portions 112 and 113 disposed on both end-surfaces of the capacitance formation portion Ac in the first direction.

Specifically, the body 110 may include a first cover portion 112 disposed on one surface of the capacitance formation portion Ac in the first direction, and a second cover portion 113 disposed on the other surface of the capacitance formation portion Ac in the first direction, and more specifically, the body 110 may include an upper cover portion 112 disposed above the capacitance formation portion Ac in the first direction, and a lower cover portion 113 disposed below the capacitance formation portion Ac in the first direction.

The upper cover portion 112 and the lower cover portion 113 may be formed by stacking a single dielectric layer 111 or two or more dielectric layers 111 on upper and lower surfaces of the capacitance formation portion Ac in the first direction, respectively, and may basically serve to prevent damage to the internal electrodes 121 and 122 due to physical or chemical stress.

The upper cover portion 112 and the lower cover portion 113 do not include the internal electrodes 121 and 122, and may include the same material as dielectric layer 111. That is, the upper cover portion 112 and the lower cover portion 113 may include a ceramic material, and may include, for example, a barium titanate ($BaTiO_3$)-based ceramic material.

Meanwhile, the thickness tc of the cover portions 112 and 113 is not limited.

However, in order to more easily achieve miniaturization and high capacitance of the multilayer electronic component, the thickness tc of the cover portions 112 and 113 may be 100 μm or less, preferably 30 μm or less, and more preferably 20 μm or less in ultra-small products.

Here, the thickness tc of the cover portions 112 and 113 may refer to a first directional size of the cover portions 112 and 113 in the first direction. Additionally, the thickness tc of the cover portions 112 and 113 may refer to the average thickness tc of the cover portions 112 and 113, and may refer to an average size of the cover portions 112 and 113 in the first direction.

The average size of the cover portions 112 and 113 in the first direction may be measured by scanning images of the first and second directional cross-sections of the body 110 with the scanning electron microscope (SEM) of 10,000× magnification. More specifically, the average size thereof may refer to an average value calculated by measuring the first directional size at 30 points equally spaced from each other in the second direction in the image obtained by scanning one cover portion.

Additionally, the average size of the cover portion in the first direction measured by the above-described method may have substantially the same size as the average size of the cover portion in the first direction in the first and third directional cross-sections of the body 110.

Meanwhile, the multilayer electronic component 100 may include side margin portions 114 and 115 disposed on both third directional end-surfaces of the body 110.

More specifically, the side margin portions 114 and 115 may include a first side margin portion 114 disposed on the fifth surface 5 of the body 110 and a second side margin portion 115 disposed on the sixth surface 6 of the body 110. That is, the side margin portions 114 and 115 may be disposed on both end-surfaces of the body 110 in the third direction.

As illustrated, the side margin portions 114 and 115 may refer to a region between both ends of the first and second internal electrodes 121 and 122 in the third direction and a boundary surface of the body 110, based on the first and third directional cross-sections of the body 110.

The side margin portions 114 and 115 may basically serve to prevent damage to the internal electrodes 121 and 122 due to physical or chemical stress.

The side margin portions 114 and 115 may formed by applying a conductive paste to form the internal electrodes 121 and 122 except where the side margin portions 114 and 115 are to be formed on the ceramic green sheet, and cutting the stacked internal electrodes 121 and 122 so that the internal electrodes 121 and 122 are exposed to the fifth and sixth surfaces 5 and 6 of the body 110 in order to suppress a step portion caused by the internal electrodes 121 and 122, and then stacking a single dielectric layer 111 or two or more dielectric layers 111 in the third directional on both third directional end-surfaces of the capacitance formation portion Ac in the third direction.

The first side margin portion 114 and the second side margin portion 115 do not include the internal electrodes 121 and 122 and may include the same material as the dielectric layer 111. That is, the first side margin portion 114 and the second side margin portion 115 may include a ceramic material, and may include, for example, a barium titanate ($BaTiO_3$) based ceramic material.

Meanwhile, a width wm of the first and second side margin portions 114 and 115 is not limited.

However, in order to more easily achieve the miniaturization and the high capacitance of the multilayer electronic component 100, the width wm of the side margin portions 114 and 115 may be 100 μm or less, preferably 30 μm or less, and more preferably 20 μm or less in ultra-small products.

Here, the width wm of the side margin portions 114 and 115 may refer to a third directional size of the side margin portions 114 and 115. Additionally, the width wm of the side margin portions 114 and 115 may refer to the average width wm of the side margin portions 114 and 115, and may refer to an average size of the side margin portions 114 and 115 in the third direction.

The average size of the side margin portions 114 and 115 in the third direction may be measured by scanning images of the first and third directional cross-sections of the body 110 with the scanning electron microscope (SEM) of 10,000× magnification. More specifically, the average size thereof may refer to an average value calculated by measuring the third directional size at 10 points equally spaced apart from each other in the first direction in an image obtained by scanning one side margin portion.

Meanwhile, in order to achieve miniaturization and high capacitance of the multilayer electronic component, maximization of an effective electrode area (increasing the effective volume fraction required to realize capacitance) is required. In order to implement a miniaturized and high capacitance multilayer ceramic capacitor as described above, in manufacturing a multilayer ceramic capacitor, a method has been applied in which the internal electrodes may be exposed in the width direction of the body to maximize an area of the internal electrode in the width direction through margin-free design, but after manufacturing such a body, a ceramic green sheet for side margin portions is separately attached to an exposed surface of an electrode in the width direction of the body in a pre-sintering operation and is then sintered.

The side margin portion may be formed by the method of separately attaching the ceramic green sheet for side margin portions, thus increasing the capacitance per unit volume of the capacitor, but problems such as shortened chip lifespan or defects may occur due to penetration of external moisture through an interfacial bonding portion of the body and the side margin portion, or the penetration of plating solution during a plating process.

Additionally, aggregate concentration occurs due to pores generated in an interfacial surface on which the body and the side margin portion are in contact with each other, and thus, the problem of lowering the breakdown voltage (BDV) may occur, the pores may cause a decrease in moisture resistance reliability due to a decrease in sintering densification, and interfacial bonding portions may occur at boundaries between the body and the side margin portion, resulting in a decrease in bonding strength and a subsequent decrease in moisture resistance reliability.

In the present disclosure, the side margin portions may be formed to be longer than conventional side margin portions so that the side margin portions are disposed on the body to cover the body, a penetration path of external moisture or a plating solution that may penetrate through the interfacial bonding portion formed at the boundaries between the body and the side margin portions may be blocked or diverted to improve the above-mentioned problems.

Accordingly, in the multilayer electronic component 100 according to an example embodiment of the present disclosure, the first and second side margin portions 114 and 115 are first extension portions 114-1, 114-2, 115-1 and 115 disposed to extend onto portions of the first and second surfaces 1 and 2.

That is, the first side margin portion 114 may include first extension portions 114-1 and 114-2 disposed on portions of the first and second surfaces 1 and 2, and specifically, the first extension portions 114-1 and 114-2 of the first side margin portion may include a second-first extension portion 114-1 disposed on a portion of the first surface 1, and a second-second extension portion 114-2 disposed in a portion of the second surface 2. The second side margin portion 115 may include first extension portions 115-1 and 115-2 disposed on portions of the first and second surfaces 1 and 2, and specifically, the first extension portions 115-1 and 115-2 of the second side margin portion may include a first-first extension portion 115-1 disposed on a portion of the first surface 1 and a first-second extension portion 115-2 disposed in a portion of the second surface 2.

More specifically, the first side margin 114 may include a main portion 114-0 disposed on the fifth surface 5, a first-first extension portion 114-1 disposed to extend onto a portion of the first surface 1, and a first-second extension portion 114-2 disposed to extend onto a portion of the second surface 2. The second side margin portion 115 may include a main portion 115-0 disposed on the sixth surface 6, a first-first extension portion 115-1 disposed to extend onto a portion of the first surface 1, and a first-second extension portion 115-2 disposed to extend onto a portion of the second surface 2.

In the present disclosure, unless otherwise specified, the description of the first extension portions 114-1 and 114-2 of the first side margin portion may be applied identically to the first-first extension portion 114-1 disposed on a portion of the first surface 1 and the first-second extension portion 114-2 disposed on a portion of the second surface 2, and the description of the first extension portions 115-1 and 115-2 of the second side margin portion may be applied identically to the first-first extension portion 115-1 disposed on a portion of the first surface 1 and the first-second extension portion 115-2 disposed on a portion of the second surface 2.

The first and second side margin portions 114 and 115 may include the first extension portions 114-1, 114-2, 115-1 and 115-2 disposed to extend onto portions of the first and second surfaces 1 and 2 of the body, thereby effectively preventing penetration of external moisture or plating liquid, and improving moisture resistance reliability.

In this case, when a third directional size of a central portion of the first extension portions 114-1, 114-2, 115-1 and 115-2 in the second direction is referred to as WM1, and a third directional size of an end of the first extension portions 114-1, 114-2, 115-1 and 115-2 in the second direction is referred to as WC1, WM1<WC1 may be satisfied.

As the first extensions 114-1, 114-2, 115-1, and 115-2 satisfy WM1<WC1, interfacial bonding force between the body 110 and the side margin portions 114 and 115 may be excellent, and specifically, moisture penetration may be further suppressed in corner portions of the body 110 into which external moisture may easily penetrate, for example, in regions in which the body 110, the side margin portions 114 and 115 and the external electrodes 131 and 132 meet each other, thereby further improving the moisture resistance reliability of the multilayer electronic component 100.

When the first extension portions 114-1, 114-2, 115-1 and 115-2 satisfy WC1<WM1, there may be a risk that moisture resistance reliability may decrease due to easy penetration of the external moisture.

For WM1 and WC1 of the first extension portions 114-1, 114-2, 115-1 and 115-2, the first-second extension portion 114-2 of the first side margin portion may be described in more detail as an example as follow.

In the first-second extension portion 114-2 of the first side margin portion disposed on the second surface 2, when the first-second extension portion 114-2 of the first side margin portion is divided into three equal parts in the second direction, a central region of the three equal parts may correspond to a central portion of the first-second extension portion 114-2 of the first side margin portion, and the remaining parts on both sides may correspond to the ends of the first-second extension portion 114-2 of the first side margin portion. In this case, a third directional size at any point in the second direction among the central portion of the first-second extension portion 114-2 of the first side margin portion may be defined as WM1, and a third directional size at any point in the second direction among the ends of the first-second extension portion 114-2 of the first side margin portion may be defined as WC1.

For a more desirable example, a minimum size in the third direction of the first-second extension portion 114-2 of the first side margin portion among the central portion of the first-second extension portion 114-2 of the first side margin portion may be defined as WM1, and a third directional size of the first-second extension portion 114-2 of the first side margin portion disposed on an extension surface of the third surface 3 among the ends of the first-second extension portion 114-2 of the first side margin portion may be defined as WC1, but the present disclosure is not particularly limited thereto, and a third directional size of the first-second extension portion 114-2 of the first side margin portion disposed on an extension surface of the fourth surface 4 among the ends of the first-second extension portion 114-2 of the first side margin portion may also be defined as WC1. In this description, the first-second extension portion 114-2 of the first side margin portion is described as an example, but it would be obvious that the description thereof may be applied identically to the first-first extension portion 114-1 of the first side margin portion, and the first-first and first-second extension portions 115-1 and 115-2 of the second side margin portion.

Additionally, in the multilayer electronic component 100 according to an example embodiment of the present disclosure, the first extension portions 114-1, 114-2, 115-1 and 115-2 of the first and second side margin portions may include a substantially concave-shaped region, and may be preferably a substantially concave-shaped region.

Additionally, in the multilayer electronic component 100 according to an example embodiment of the present disclosure, the first extension portions 114-1, 114-2, 115-1 and 115-2 of the first and second side margin portions may include a region in which the third directional size of the first extension portions 114-1, 114-2, 115-1 and 115-2 of the first and second side margin portions increases from a central portion in the second direction of the first extension portions 114-1, 114-2, 115-1 and 115-2 of the first and second side margin portions to an end in the second direction of the first extension portions 114-1, 114-2, 115-1 and 115-2 of the first and second side margin portions, and may be, preferably, an increasing region.

The first extension portions 114-1, 114-2, 115-1 and 115-2 of the first and second side margin portions may include a substantially concave shape, or may include a region in which the third directional size increases from the central portion in the second direction to the second directional end, so that the interfacial bonding force between the body 110 and the side margin portions 114 and 115 may be excellent, and the moisture resistance reliability may be further improved.

Meanwhile, in the multilayer electronic component 100 according to an example embodiment of the present disclosure, when the average size of the body 110 in the third direction is referred to as Wb, the average size in the third direction of each of the first and second side margin portions 114-0 and 115-0 disposed on the fifth and sixth surfaces 5 and 6 is referred to as WM0, and the above-mentioned MC1 is referred to as a third directional size of the first extension portions 114-1, 114-2, 115-1 and 115-2 disposed on extension surfaces of the third and fourth surfaces 3 and 4, and when $CR1=2*(WC1-WM0)/Wb$ is provided, $0<CR1<10\%$ may be satisfied, and more preferably, $4\%\leq CR1\leq6\%$ may be satisfied.

As $0<CR1<10\%$ is satisfied, the bonding force between the body 110 and the side margin portions 114 and 115 may be excellent, and the moisture resistance reliability may be improved.

When $10\%\leq C1$ is provided, since the third directional size of the first extension portions 114-1, 114-2, 115-1 and 115-2 disposed to extend to the first and second surfaces 1 and 2 becomes excessively large, a tip of the first extension portion may be thickened or curled, and thus, the bonding force between the body 110 and the side margin portions 114 and 115 may be reduced, and interface lifting may occur between the body 110 and the side margin portions 114 and 115. Additionally, with a decrease in the interfacial bonding force, there may be a risk that some components may be detached and cause foreign matter defects.

Here, Wb may refer an average size of the body 110 in the third direction, and may refer to an average value obtained by measuring the third directional size at 10 points equally spaced from each other in the second direction.

WM0 may refer to an average size in the third direction of the main portion 114-0 of the first side margin portion arranged on the fifth surface 5 or an average size in the third direction of the main portion 115-0 of the second side margin portion arranged on the sixth surface 6, and may refer to an average value obtained by measuring the third directional size at 5 points equally spaced apart from each other in the second direction, in the main portions 114-0 and 115-0 of the first and second side margin portions.

For WM1, when the first-second extension portion 114-2 of the first side margin portion is described as an example, WM1 may refer to a minimum size in the third direction from the central portion in the second direction of the first-second extension portion 114-2 of the first side margin, and when it is difficult to accurately determine the minimum size in the third direction, WM1 may refer to a third directional size of the central portion in the second direction of the first-second extension portion 114-2 of the first side margin portion. In this description, only WM1 of the first-second extension portion 114-2 of the first side margin portion has been described, but it would be obvious that the description of WM1 may be applied identically to the first-first extension portion 114-1 of the first side margin, and the first-first and first-second extension portions 115-1 and 115-2 of the second side margin.

For WC1, when the first-second extension portion 114-2 of the first side margin portion is described as an example, WC1 may refer to a third directional size of the first-second extension portion 114-2 of the first side margin portion disposed on an extension surface of the third surface 3 among the first-second extension portion 114-2 of the first side margin portion. However, the present disclosure is not limited thereto, and WC1 may also refer to a third directional size of the first-second extension portion 114-2 of the first side margin portion disposed on an extension surface of the fourth surface 4 among the first-second extension portion 114-2 of the first side margin portion. In this description, only WC1 of the first-second extension portion 114-2 of the first side margin portion has been described, but it would be obvious that the description of WC1 may be applied identically to the first-first extension portion 114-1 of the first side margin, and the first-first and first-second extension portions 115-1 and 115-2 of the second side margin portion.

Meanwhile, in the multilayer electronic component 100 according to another example embodiment of the present disclosure, the first and second side margin portions 114 and 115 may include second extension portions 114-3, 114-4, 115-3 and 115-4 disposed to extend onto portions of the third and fourth surfaces 3 and 4.

That is, the first side margin portion 114 may include the second extension portions 114-3 and 114-4 disposed on a portion of the third and fourth surfaces 3 and 4, and specifically, the second extension portions 114-3 and 114-4 of the first side margin portion may include a second-first extension portion 114-3 disposed on a portion of the third surface 3, and a second-second extension portion 114-4 disposed on a portion of the fourth surface 4. The second side margin portion 115 may include the second extension portions 115-3 and 115-4 disposed on a portion of the third and fourth surfaces 3 and 4, and specifically, the second extension portions 115-3 and 115-4 of the second side margin portion may include a second-first extension portion 115-3 disposed on a portion of the third surface 3, and a second-second extension portion 115-4 disposed on a portion of the fourth surface 4.

More specifically, the first side margin portion 114 may include the main portion 114-0 disposed on the fifth surface 5, the second-first extension portion 114-3 disposed to extend onto a portion of the third surface 3, and a second-second extension portion 114-4 disposed to extend onto a portion of the fourth surface 4. The second side margin portion 115 may include a main portion 115-0 disposed on the sixth surface 6, the second-first extension portion 115-3 disposed to extend onto a portion of the third surface 3, and a second-second extension portion 115-4 disposed to extend onto a portion of the fourth surface 4.

In the present disclosure, unless otherwise specified, the description of the second extension portions 114-3 and 114-4 of the first side margin portion may be applied identically to the second-first extension portion 114-3 disposed on a portion of the third surface 3 and the second-second extension portion 114-4 disposed on a portion of the fourth surface 4, and the description of the second extension portions 115-3 and 115-4 of the second side margin portion may applied identically to the second-first extension portion 115-3 disposed on a portion of the third surface 3 and the second-second extension portion 115-4 disposed on a portion of the fourth surface 4.

The first and second side margin portions 114 and 115 may be second extension portions 114-3, 114-4, 115-3 and 115-4 disposed to extend onto portions of the third and fourth surfaces 3 and 4 of the body, thereby effectively preventing penetration of external moisture or plating liquid and improving moisture resistance reliability.

In this case, when a third directional size of a central portion of the second extension portions 114-3, 114-4, 115-3 and 115-4 in the first direction is referred to as WM2, and the third directional size of an end of the second extension portions 114-3, 114-4, 115-3 and 115-4 in the first direction is referred to as WC2, WM2<WC2 may be satisfied. As the second extension portions 114-3, 114-4, 115-3 and 115-4 satisfy WM2<WC2, the interfacial bonding force between the body 110 and the side margin portions 114 and 115 may be excellent, and specifically, moisture penetration may be further suppressed in corner portions of the body 110 into which external moisture may easily penetrate, for example, in regions in which the body 110, the side margin portions 114 and 115 and the external electrodes 131 and 132 meet each other, thereby further improving the moisture resistance reliability of the multilayer electronic component 100.

When the second extension portions 114-3, 114-4, 115-3 and 115-4 satisfy WC2<WM2, there may be a risk that moisture resistance reliability may decrease due to easy penetration of the external moisture.

For WM2 and WC2 of the second extensions 114-3, 114-4, 115-3 and 115-4, the second-first extension portion 114-3 of the first side margin portion may be described in more detail as an example as follows.

In the second-first extension portion 114-3 of the first side margin disposed on the third surface 3, when the second-first extension portion 114-3 of the first side margin portion is divided into three equal parts in the first direction, a central region of the three equal parts may correspond to a central portion of the second-first extension portion 114-3 of the first side margin portion, and the remaining upper and lower regions may correspond to ends of the second-first extension portion 114-3 of the first side margin portion. In this case, a third directional size at any point in the first direction among the central portion of the second-first extension portion 114-3 of the first side margin portion may be defined as WM2, and a third directional size at any point in the first direction among the ends of the second-first extension portion 114-3 of the first side margin portion may be defined as WC2.

For a more desirable example, a minimum size in the third direction of the second-first extension portion 114-3 of the first side margin portion among the central portions of the second-first extension portion 114-3 of the first side margin portion may be defined as WM2, and a third directional size of the second-first extension portion 114-3 of the first side margin portion disposed on an extension surface of the first surface 1 among the ends of the second-first extension portion 114-3 of the first side margin portion may be defined as WC2, but the present disclosure is not limited thereto, and a third directional size of the second-first extension portion 114-3 of the first side margin portion disposed on an extension surface of the second surface 2 among the ends of the second-first extension portion 114-3 of the first side margin portion may also be defined as WC2. In this description, the second-first extension portion 114-3 of the first side margin portion is described as an example, but it would be obvious that the description thereof may be applied identically to the second-second extension portion 114-4 of the first side margin portion and the second-first and second-second extension portions 115-3 and 115-4 of the second side margin portion.

Additionally, in the multilayer electronic component 100 according to another example embodiment of the present disclosure, the second extension portions 114-3, 114-4, 115-3 and 115-4 of the first and second side margin portions may include a substantially concave-shaped region, and may be preferably a substantially concave-shaped region.

Additionally, in the multilayer electronic component 100 according to an example embodiment of the present disclosure, the second extension portions 114-3, 114-4, 115-3 and 115-4 of the first and second side margin portions may include a region in which the third directional size of the second extension portions 114-3, 114-4, 115-3 and 115-4 of the first and second side margin portions increases from a central portion in the first direction of the second extension portions 114-3, 114-4, 115-3 and 115-4 of the first and second side margin portions to an end in the first direction of the second extension portions 114-3, 114-4, 115-3 and 115-4 of the first and second side margin portions, and may be, a preferably, an increasing region.

The second extension portions 114-3, 114-4, 115-3 and 115-4 of the first and second side margin portions may include a substantially concave shape, or may include a region in which the third directional size increases from the central portion in the first direction to the first directional end, so that the interfacial bonding force between the body 110 and the side margin portions 114 and 115 may be excellent, and the moisture resistance reliability may be further improved.

Meanwhile, in the multilayer electronic component 100 according to another example embodiment of the present disclosure, when the average size of the body 110 in the third direction is referred to as Wb, the average size in the third direction of each of the first and second side margin portions 114-0 and 115-0 disposed on the fifth and sixth surfaces 5 and 6 is referred to as WM0, and the above-mentioned MC2 is referred to as a third directional size of the second extension portions 114-3, 114-4, 115-3 and 115-4 disposed on extension surfaces of the first and second surfaces 1 and 2, and when $CR2=2*(WC2-WM0)/Wb$ is provided, $0<CR2<10\%$ may be satisfied, and more preferably, $2\% \le CR2 \le 4\%$ may be satisfied.

As $0<CR2<10\%$ is satisfied, the bonding force between the body 110 and the side margin portions 114 and 115 may be excellent, and the moisture resistance reliability can be improved.

When $10\% \le C2$ is provided, since the third directional size of the second extension portions 114-3, 114-4, 115-3 and 115-4 disposed to extend to the third and fourth surfaces 3 and 4 becomes excessively large, a tip of the second extension portion may be thickened or curled, and thus, the bonding force between the body 110 and the side margin portions 114 and 115 may be reduced, and interface lifting may occur between the body 110 and the side margin portions 114 and 115.

Here, Wb may refer to an average size of the body 110 in the third direction, and may refer to an average value obtained by measuring the third directional size at 10 points equally spaced from each other in the first direction.

WM0 may refer to an average size in the third direction of the main portion 114-0 of the first side margin disposed on the fifth surface 5 or an average size in the third direction of the main portion 115-0 of the second side margin disposed on the sixth surface 6, and may refer to an average value obtained by measuring the third directional size at five points equally spaced apart from each other in the first direction, in the main portions 114-0 and 115-0 of the first and second side margin portions.

For WM2, when the second-first extension portion 114-3 of the first side margin portion is described as an example, WM2 may refer to a minimum size in the third direction from the central portion in the first direction of the second-first extension portion 114-3 of the first side margin portion, and when it is difficult to accurately determine the minimum size in the third direction, WM2 may refer to a third directional size of the central portion in the second direction of the second-first extension portion 114-3 of the first side margin portion. In this description, only WM2 of the second-first extension portion 114-3 of the first side margin portion has been described, but it would be obvious that the description of WM2 may be applied identically to the second-second extension portion 114-4 of the first side margin portion and the second-first and second-second extension portions 114-3 and 115-4 of the second side margin portion.

For WC2, when the second-first extension portion 114-3 of the first side margin portion is described as an example, WC2 may refer to a third directional size of the second-first extension portion 114-3 of the first side margin portion disposed on the extension surface of the first surface 1 among the second-first extension portions 114-3 of the first side margin portion. However, the present disclosure is not limited thereto, and WC2 may also refer to a third directional size of the second-first extension portion 114-3 of the first side margin portion disposed on the extension surface of the second surface 2 among the second-first extension portion 114-3 of the first side margin portion. In this description, only WC2 of the first-second extension portion 114-2 of the first side margin portion has been described, but it would be obvious that the description of WC2 may be applied identically to the second-second extension portion 114-4 of the first side margin portion and the second-first and second-second extension portions 115-3 and 115-3 of the second side margin portion.

Additionally, the second extension portions 114-3, 114-4, 115-3 and 115-4 may be disposed to be in contact with a portion of the internal electrodes 121 and 122 exposed to one surface of the body 110.

More specifically, the second-first extension portion 114-3 of the first side margin portion may be disposed to be in contact with a portion of the first internal electrode 121 exposed to the third surface 3, and the second-second extension portion 114-4 of the first side margin portion may be disposed to be in contact with a portion of the second internal electrode 122 exposed to the fourth surface 4. The second-first extension portion 115-3 of the second side margin portion may be disposed to be in contact with a portion of the first internal electrode 121 exposed to the third surface 3, and the second-second extension portion 115-4 of the second side margin portion may be disposed to be in contact with a portion of the second internal electrode 122 exposed to the fourth surface 4.

The second extension portions 114-3, 114-4, 115-3 and 115-4 may be disposed to be in contact with the first and second internal electrodes 121 and 122 exposed to the third and fourth surfaces 3 and 4 of the body 110, respectively, so that it may be possible to more effectively prevent external moisture from penetrating inside and deteriorating the internal electrodes.

In this regard, the second extension portions 114-3, 114-4, 115-3 and 115-4 may be disposed to be in contact with second directional ends of the first and second internal electrodes 121 and 122 exposed to the third and fourth surfaces 3 and 4, respectively.

The fact that the second extension portions 114-3, 114-4, 115-3 and 115-4 are disposed to be in contact with a portion of the internal electrodes 121 and 122 may denote that the second extension portions 114-3, 114-4, 115-3 and 115-4 are disposed to cover a portion of the internal electrodes 121 and 122.

Additionally, in another example embodiment of the present disclosure, the first and second side margin portions 114 and 115 may include first and second extension portions 114-1, 114-2, 114-3, 114-4, 115-1, 115-2, 115-3 and 115-4 at the same time, and the explanation therefor is the same as described above and will be omitted.

In an example embodiment of the present disclosure, a structure in which the ceramic electronic component 100 has two external electrodes 131 and 132 is described, but the number or shape of the external electrodes 131 and 132 may be changed depending on the shape of the internal electrodes 121 and 122 or other purposes.

The external electrodes 131 and 132 may be disposed on the body 110 and may be connected to the internal electrodes 121 and 122.

More specifically, the external electrodes 131 and 132 may be disposed on the third and fourth surfaces 3 and 4 of the body 110, respectively, and may include first and second external electrodes 131 and 132 connected to the first and second internal electrodes 121 and 122, respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

Additionally, the external electrodes 131 and 132 may be disposed to extend onto portions of the first and second surfaces 1 and 2 of the body 110, and may also be disposed to extend onto portions of the fifth and sixth surfaces 5 and 6 of the body 110. That is, the first external electrode 131 may be disposed on a portion of the first, second, fifth, and sixth surfaces 1, 2, 5 and 6 of the body 110 and disposed on the third surface 3 of the body 110, and the second external electrode 132 may disposed on a portion of the first, second, fifth and sixth surfaces 1, 2, 5 and 6 of the body 110 and disposed on the third surface 3 of the body 110.

In the case of a region in which the external electrodes 131 and 132 are disposed on the side margin portions 114 and 115, the external electrodes 131 and 132 may be disposed to be as thick as the side margin portions 114 and 115, and for example, a region of the external electrodes 131 and 132 disposed on the side margin portions 114 and 115 may include a convex shape, and a region of the external electrodes 131 and 132 not disposed on the side margin portions 114 and 115 may have a non-convex shape.

The external electrodes 131 and 132 may be formed using any material as long as the material has electrical conductivity, such as a metal, and the specific material may be determined in consideration of electrical properties, structural stability, and the like, and external electrodes 131 and 132 may further have a multilayer structure.

For example, the external electrodes 131 and 132 may include electrode layers 131a and 132a disposed on the body 110 and plating layers disposed on the electrode layers 131a and 132a.

For more specific examples of the electrode layers 131a and 132a, the electrode layers 131a and 132a may be sintered electrodes including a conductive metal and glass, or may be resin-based electrodes including a conductive metal and a resin.

Additionally, the electrode layers 131a and 132a may be formed by sequentially forming the sintered electrode and the resin-based electrode on the body 110.

Additionally, the electrode layers 131a and 132a are formed by transferring a sheet including a conductive metal onto the body 110, or may be formed by transferring a sheet including the conductive metal onto the sintered electrode.

The conductive metal used for the electrode layers 131a and 132a is not particularly limited as long as the material of the conductive metal may be electrically connected to the internal electrodes 121 and 122 to form capacitance, and the conductive metal may include, for example, one or more selected from the group consisting of nickel (Ni), copper (Cu), palladium (Pd), silver (Ag), gold (Au), platinum (Pt), tin (Sn), tungsten (W), titanium (Ti), and alloys thereof. The electrode layers 131a and 132a may be formed by applying a conductive paste prepared by adding a glass frit to the conductive metal particles and then sintering the conductive paste.

The plating layers 131b and 132b may server to improve mounting characteristics.

The types of plating layers 131b and 132b are not particularly limited, and the plating layers 131b and 132b may be a single layer of plating layers 131b and 132b including one or more of nickel (Ni), tin (Sn), silver (Ag), palladium (Pd) and alloys thereof, and may be formed of a plurality of layers.

For more specific examples of the plating layers 131b and 132b, the plating layers 131b and 132b may be Ni plating layers or Sn plating layers, and may be in the form in which the Ni plating layer and the Sn plating layer are sequentially formed on the electrode layers 131a and 132a and may be in the form in which the Sn plating layer, the Ni plating layer and the Sn plating layer are formed sequentially thereon. Additionally, the plating layers 131b and 132b may include a plurality of Ni plating layers and/or a plurality of Sn plating layers.

There is no need to specifically limit the size of the multilayer electronic component 100.

However, in order to achieve both miniaturization and high capacitance, the thickness of the dielectric layer and internal electrodes must be thinned to increase the number of stacked layers, and thus, the effect according to the present disclosure may be more noticeable in the multilayer electronic component 100 having a size of 1005 (length×width: 1.0 mm×0.5 mm) or less.

Although the example embodiment of the present disclosure has been described in detail above, the present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

In addition, the expression 'an example embodiment' used in the present disclosure does not mean the same embodiment, and is provided to emphasize and explain different unique characteristics. However, the embodiments presented above do not preclude being implemented in combination with the features of another embodiment. For example, although items described in a specific embodiment are not described in another embodiment, the items may be understood as a description related to another embodiment unless a description opposite or contradictory to the items is in another embodiment.

In the present disclosure, the terms are merely used to describe a specific embodiment, and are not intended to limit the present disclosure. Singular forms may include plural forms as well unless the context clearly indicates otherwise.

What is claimed is:

1. A multilayer electronic component, comprising:
a body including a dielectric layer and internal electrodes alternately disposed with the dielectric layer in a first direction, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
first and second external electrodes disposed on the third and fourth surfaces, respectively; and
first and second side margin portions disposed on the fifth and sixth surfaces, respectively,
wherein the first and second side margin portions include a first extension portion disposed to extend onto portions of the first and second surfaces, and
when a third directional size of a central portion of the first extension portion in the second direction is referred to as WM1, and a third directional size of an end of the first extension portion in the second direction is referred to as WC1, WM1<WC1 is satisfied.

2. The multilayer electronic component according to claim 1, wherein the first extension portion includes a substantially concave-shaped region.

3. The multilayer electronic component according to claim 1, wherein the first and second side margin portions include a region in which a third directional size of the first extension portion increases from the central portion of the first extension portion in the second direction to the end of the first extension portion in the second direction.

4. The multilayer electronic component according to claim 1, wherein when an average size of the body in the third direction is referred to as Wb, an average size in the third direction of each of the first and second side margin portions disposed on the fifth and sixth surfaces is referred to as WM0, and when CR1=2*(WC1−WM0)/Wb is provided, 0<CR1<10% is satisfied.

5. The multilayer electronic component according to claim 1, wherein the first and second side margin portions further include a second extension portion disposed to extend onto portions of the third and fourth surfaces,
when a third directional size of a central portion of the second extension portion in the first direction is referred to as WM2, and a third directional size of an end of the second extension portion in the first direction is referred to as WC2, WM2<WC2 is satisfied.

6. The multilayer electronic component according to claim 5, wherein the second extension portion includes a concave-shaped region.

7. The multilayer electronic component according to claim 5, wherein the first and second side margin portions include a region in which a third directional size of the second extension portion increases from the central portion of the second extension portion in the first direction to the end of the second extension portion in the first direction.

8. The multilayer electronic component according to claim 5, wherein when an average size of the body in the third direction is referred to as Wb, an average size in the third direction of each of the first and second side margin portions disposed on the fifth and sixth surfaces is referred to as WM0, and the WC2 is referred to as the third directional size of the second extension portion disposed on extension surfaces of the first and second surfaces, and when CR2=2*(WC2−WM0)/Wb is provided, 0<CR2<10% is satisfied.

9. The multilayer electronic component according to claim 5, wherein the internal electrodes include a first internal electrode exposed to the third surface and a second internal electrode exposed to the fourth surface, and the second extension portion is disposed to be in contact with a portion of the first and second internal electrodes on the third and fourth surfaces.

10. A multilayer electronic component, comprising:

a body including a dielectric layer and internal electrodes alternately disposed with the dielectric layer in a first direction, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;

first and second external electrodes disposed on the third and fourth surfaces, respectively; and first and second side margin portions disposed on the fifth and sixth surfaces, respectively, wherein the first and second side margin portions include a second extension portion extending to a portion of the third and fourth surfaces, and when a third directional size of a central portion of the second extension portion in the first direction is referred to as WM2, and a third directional size of an end of the second extension portion in the first direction is referred to as WC2, WM2<WC2 is satisfied.

11. The multilayer electronic component according to claim 10, wherein the second extension portion includes a concave-shaped region.

12. The multilayer electronic component according to claim 10, wherein the first and second side margin portions include a region in which a third directional size of the second extension portion increases from the central portion of the second extension portion in the first direction to the end of the second extension portion in the first direction.

13. The multilayer electronic component according to claim 10, wherein when an average size of the body in the third direction is referred to as Wb, an average size in the third direction of each of the first and second side margin portions disposed on the fifth and sixth surfaces is referred to as WM0, and when CR2=2*(WC2−WM0)/Wb is provided, 0<CR2<10% is satisfied.

14. The multilayer electronic component according to claim 10, wherein the internal electrodes include a first internal electrode exposed to the third surface and a second internal electrode exposed to the fourth surface, and the second extension portion is disposed to be in contact with a portion of the first and second internal electrodes on the third and fourth surfaces.

15. The multilayer electronic component according to claim 10, wherein the first and second side margin portions further include a first extension portion disposed to extend onto portions of the first and second surfaces, and when a third directional size of a central portion of the first extension portion in the second direction is referred to as WM1, and a third directional size of the first extension portion disposed on extension surfaces of the third and fourth surfaces disposed in an end of the first extension portion in the second direction is referred to as WC1, WM1<WC1 is satisfied.

16. The multilayer electronic component according to claim 15, wherein the first and second side margin portions include a region in which a third directional size of the first extension portion increases from the central portion of the first extension portion in the second direction to the end of the first extension portion in the second direction.

17. The multilayer electronic component according to claim 15, wherein when an average size of the body in the third direction is referred to as Wb and an average size in the third direction of each of the first and second side margin portions disposed on the fifth and sixth surfaces is referred to as WM0, and when CR1=2*(WC1−WM0)/Wb is provided, 0<CR1<10% is satisfied.

18. A multilayer electronic component, comprising:

a capacitance forming portion comprising internal electrodes and dielectric layers stacked alternately in a thickness direction, wherein the internal electrodes are exposed through width-wise opposing surfaces of the capacitance forming portion and alternate internal electrodes are exposed from length-wise opposing surfaces of the capacitance forming portion;

cover portions disposed on thickness-wise opposing surfaces of the capacitance forming portion; and side margin portions disposed on the width-wise opposing surfaces of the capacitance forming portion and cover portions, and comprising a first extension portion extending on to thickness-wise opposing surfaces of the cover portions, wherein the first extension portion is relatively narrower at a length-wise central portion thereof compared to a length-wise end portion thereof.

19. The multilayer electronic component of claim 18, wherein the side margin portions further comprise a second extension portion extending to length-wise opposing surfaces of the body, and wherein the second extension portion is relatively narrower at a width-wise central portion thereof compared to a width-wise end portion thereof.

20. The multilayer electronic component of claim 18, further comprising external electrodes disposed on the length-wise opposing surfaces of the capacitance forming portion.

* * * * *